United States Patent [19]

Poulsen Jr.

[11] Patent Number: 5,012,233
[45] Date of Patent: Apr. 30, 1991

[54] COMMUNICATION SYSTEM COMPRISING A REMOTELY ACTIVATED SWITCH

[75] Inventor: Stephen D. Poulsen Jr., Basking Ridge, N.J.

[73] Assignee: AT&T Bell Laboratories, Murray Hill, N.J.

[21] Appl. No.: 404,299

[22] Filed: Sep. 7, 1989

[51] Int. Cl.⁵ .............................. G05B 23/02
[52] U.S. Cl. ..................... 340/825.18; 340/825.31; 340/825.52
[58] Field of Search ............... 364/900, 200; 340/310 R, 310 H, 310 CP, 825.18, 825.52, 825.31; 379/96, 102, 105

[56] References Cited

U.S. PATENT DOCUMENTS

| | | |
|---|---|---|
| 4,051,326 | 9/1977 | Badagnani et al. ............ 379/96 |
| 4,072,825 | 2/1978 | McLay et al. . |
| 4,086,441 | 4/1978 | Ullakko et al. . |
| 4,156,866 | 5/1979 | Miller ................. 340/825.52 X |
| 4,206,444 | 6/1980 | Ferlan ..................... 340/825.14 |
| 4,479,122 | 10/1984 | Redman et al. ........ 340/825.31 X |
| 4,531,201 | 7/1985 | Skinner, Jr. ..................... 364/200 |
| 4,582,959 | 4/1986 | Myslinski et al. . |
| 4,598,286 | 7/1986 | Miller et al. ............... 379/105 X |
| 4,625,295 | 11/1986 | Skinner .......................... 364/200 |

Primary Examiner—Ulysses Weldon
Attorney, Agent, or Firm—M. I. Finston; E. E. Pacher

[57] ABSTRACT

Disclosed is a digital communication system including a remotely operable switch. Messages from sending means to receiving means in the system are intercepted by hard wired, character-recognition means within the switch. When a message contains an activating character sequence, the switch is activated, closing an external circuit. The switch may be powered on independently of whether the receiving means are powered on or off.

14 Claims, 3 Drawing Sheets

COMMUNICATION SYSTEM COMPRISING A REMOTELY ACTIVATED SWITCH

FIELD OF THE INVENTION

This invention relates to communication systems comprising computer terminals or personal computers, and, in particular, to communication systems having the ability to convey messages to individual computer users via electronic mail.

BACKGROUND OF THE INVENTION

The ability to remotely activate a switch is a desirable property of communication networks. For example, electronic mail is a rapid and efficient method of communication between computer users. When an electronic mail message is successfully sent to a computer user, the message is stored in a file by the host computer at the receiving location (or, more generally, by a host computer in the receiving local area network) in association with the receiving user's address. If the receiving user is logged on the host computer, the host computer can readily send mail to the user or, alternatively, a message to the user indicating that he has mail waiting. However, if the receiving user's terminal is turned off, or logged on to a different host computer, the user has no way of knowing that he has mail waiting. As a consequence, electronic mail can be an effective method of mail delivery only if the user frequently logs on to a host computer. A potential solution to this problem is to have a "mail waiting" alarm that can be remotely activated even when the user's terminal is turned off or logged on to a different host computer.

Various approaches have been made to solving this and related problems, such as the problem of sending "mail waiting" or "message waiting" signals to individuals, such as hotel guests, who are served by a telephone switching system. Some approaches, as described, for example, in U.S. Pat. No. 4,582,959, issued to Myslinski, et al. on Apr. 15, 1986, store information about a received message in a database at the receiving location. Computer software residing in a computer at the receiving location checks the database and activates a signal light at the user's station or terminal to alert the user to the status of his recent messages. An alternative approach, described, for example, in U.S. Pat. No. 4,072,825, issued to McLay, et al. on Feb. 7, 1978, makes use of a microprocessor, under hardwire program or firmware command, at the receiving location to perform similar functions.

Both of these approaches require a data-processing unit associated with the message-receiving device to be operating at least part of the time between receipt of the message and successful notification of the user for whom the message is intended. Such approaches are disadvantageous because they make use of relatively expensive computational power to identify the status of messages and to signal the user. Moreover, such approaches require the relatively expensive computational power to be available either continuously, or at frequent intervals.

Some other approaches, as described, for example, in U.S. Pat. No. 4,086,441, issued to Ullakko, et al. on Apr. 25, 1978, make use of individual signaling paths, consisting of electric conductors, in order to send the activating signal. Still other approaches require a human operator to activate the "mail waiting" signal by keying in the address of the receiving station.

For reasons of economy, it is advantageous for the activating signal to be routed to the receiving station automatically (i.e., without human intervention). For example, a simple way to achieve this for the message itself to contain, or generate, the activating signal. Also for reasons of economy, it is advantageous for the activating signal to be transmissible without the need for a special signaling path. As noted above, however, even those approaches that involve automatic transmission of the activating signal through an ordinary data transmission medium still must rely upon the continuous or frequent availability of a relatively expensive data-processing unit at the receiving end.

Thus, those in the communication systems art have long sought, so far without success, a digital communication system in which a remote switch, located near a receiver and connected to the same communication medium as the receiver, can be activated by a signal routed to the receiver, without the mediation of a data-processing unit, even when the receiver is powered off.

SUMMARY OF THE INVENTION

The invention involves a digital communication system in which a remote switch, located near a receiver and connected to the same communication medium as the receiver, can be activated by a signal routed to the receiver. The switch is on a separate power circuit from the receiver, and thus it is operable even when the receiver is powered off. The switch comprises a hardwired single-purpose electronic circuit (i.e., the switch does not make use of a memory or an instruction set, and it does not involve a microprocessor or a CPU) that functions as a pattern detector. When the stream of bits being transmitted through the communication medium to the receiver includes a sequence having predetermined properties, that sequence is detected by the pattern detector and causes a circuit to be closed.

For example, a predetermined sequence of characters can be affixed to, or embedded in, an electronic mail message automatically routed to a computer terminal by a host computer. (One sequence that could be used in this manner is, for example, "!x!x!x!x!x".) If the pattern detector of a switch made according to the invention has been adapted to respond to a predetermined sequence, sending that sequence will cause the switch to close a circuit providing power, for example, to a message light.

The invention is also useful for effecting connections between a peripheral device, such as a line printer, and several independent computers. (This application of the invention is useful, for example, where several personal computers in an office share a single line printer, but the cost of linking the computers in a local area network is prohibitive.) The least expensive way to connect one of a group of computers to, e.g., a line printer for a period of time while assuring that the remaining computers are disconnected during that time, is to use a manually operated, mechanical switch. Instead of manual operation, however, a switch or relay serving the same purpose of routing a signal can readily be remotely operated using the inventive switch. That is, when an output signal is sent by one of the computers to the line printer, a predetermined sequence recognizable to the inventive switch is appended at the beginning of the signal. In response, the inventive switch operates the signal-routing switch or relay. Similarly, the inventive switch can be used to route a signal from a computer to one of two or more available output devices.

The invention is also useful for remotely switching on a device such as a computer that is accessible via telephone lines and a modem. For example, the operator of a home computer might wish to retrieve data from his office computer, which is powered off. At the office, a switch according to the invention receives data from the communication line between a modem and the office computer. When the home computer transmits a predetermined pattern, the inventive switch responds by turning the office computer on. Significantly, the predetermined pattern is readily made long enough to function as a password and preclude unauthorized users from activating the inventive switch.

DETAILED DESCRIPTION

Figure 1:
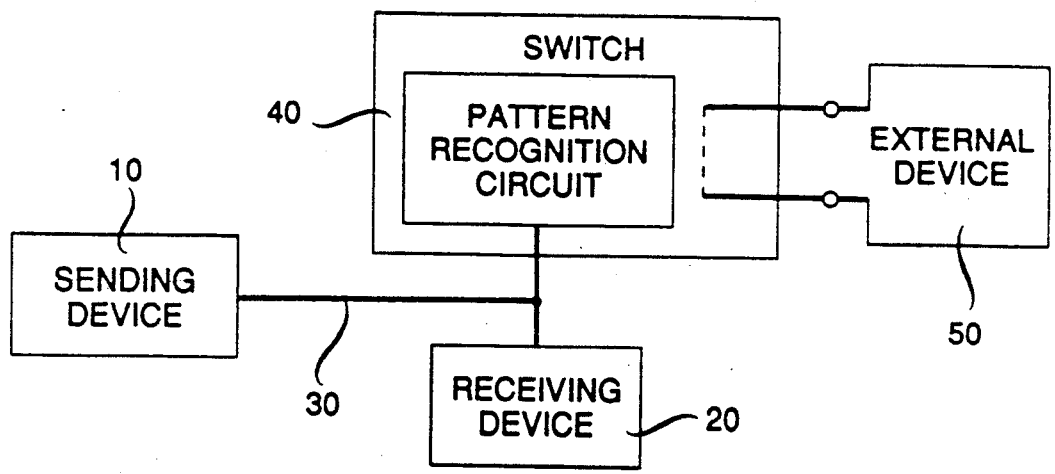
FIG. 1 shows a block diagram of a communication system according to the invention.

Turning now to FIG. 1, the invention, in a broad sense, is a communication system comprising a device 10, such as a computer, that is capable of producing digital signals, a device 20, such as a second computer, a computer terminal, or a peripheral device (e.g. an I/O device such as a line printer) that is capable of receiving digital signals, a digital communication medium 30 by way of which signals sent from sending device 10 are fed into receiving device 20, and a remotely operable switch 40. Medium 30 may comprise, for example, a cable, cable connectors, and one or more interfaces (for example, RS-232 interfaces for two-way, serial communication). Switch 40 is connected to medium 30 in such a way that it receives the same signals that are fed into receiving device 20. (For example, the switch and the receiving device may both be connected to the same end of an RS-232 interface.) However, switch 40 and receiving device 20 are on independent power circuits, such that the switch may be powered on even when the receiving device is powered off.

Switch 40 comprises a hard-wired, single-purpose circuit that is designed to recognize a predetermined pattern of digital symbols in the stream of data being fed into the receiving device. When the predetermined pattern is detected, switch 40 opens or closes a switch to activate or deactivate a device 50 external to the switch itself. Such opening or closing action may, for example, be via a relay. The external device that is activated or deactivated may be, for example, a message light, a computer, or a connection to a computer I/O device such as a line printer.

It is convenient to specify the predetermined pattern as a sequence of ASCII characters, for example, a sequence of five exclamation points (!!!!!). However, such a sequence need not be a unique set of contiguous characters. In some instances, for example, it may be advantageous to specify the pattern as a sequence of, e.g., five exclamation points, each exclamation point to be immediately followed by any character other than an exclamation point. (Other characters in addition to the exclamation point might be reserved for special purposes and therefore excluded as well.) In such an instance, any sequence of the form $!x_1!x_2!x_3!x_4!x_5$ will activate the switch, where each of the $x_i$ is any ASCII character except the exclamation point (and other excluded characters).

As a pedagogical aid to a more thorough understanding of the invention, the invention will be discussed, below, with reference to a specific embodiment that is adapted, for example, to activate a message light near a computer user's terminal when a host computer attempts to send electronic mail to the terminal. (The terms "computer terminal" and "user terminal" will hereafter refer to desktop computers as well as to terminals that are incapable of standalone operation.) The embodiment to be described is activated by character sequences, embedded in the electronic mail messages, that are similar to the sequence $!x_1!x_2!x_3!x_4!x_5$, discussed above.

Referring again to FIG. 1, sending device 10 may be, for example, the host computer in a local area network (LAN). In such a case, medium 30 comprises a cable running from the host computer toward receiving device 20, which, in this case, is a user terminal. Medium 30 also comprises, between the cable and the user terminal, a serial interface, such as an RS-232 interface. Alternatively, for example if receiving device 20 is not on a LAN, sending device 10 may communicate with receiving device 20 via telephone lines. In that case, medium 30 comprises a modem at the receiving end, as well as a cable running from the modem toward receiving device 20, and a serial interface between the cable and the receiving device.

Figure 2:
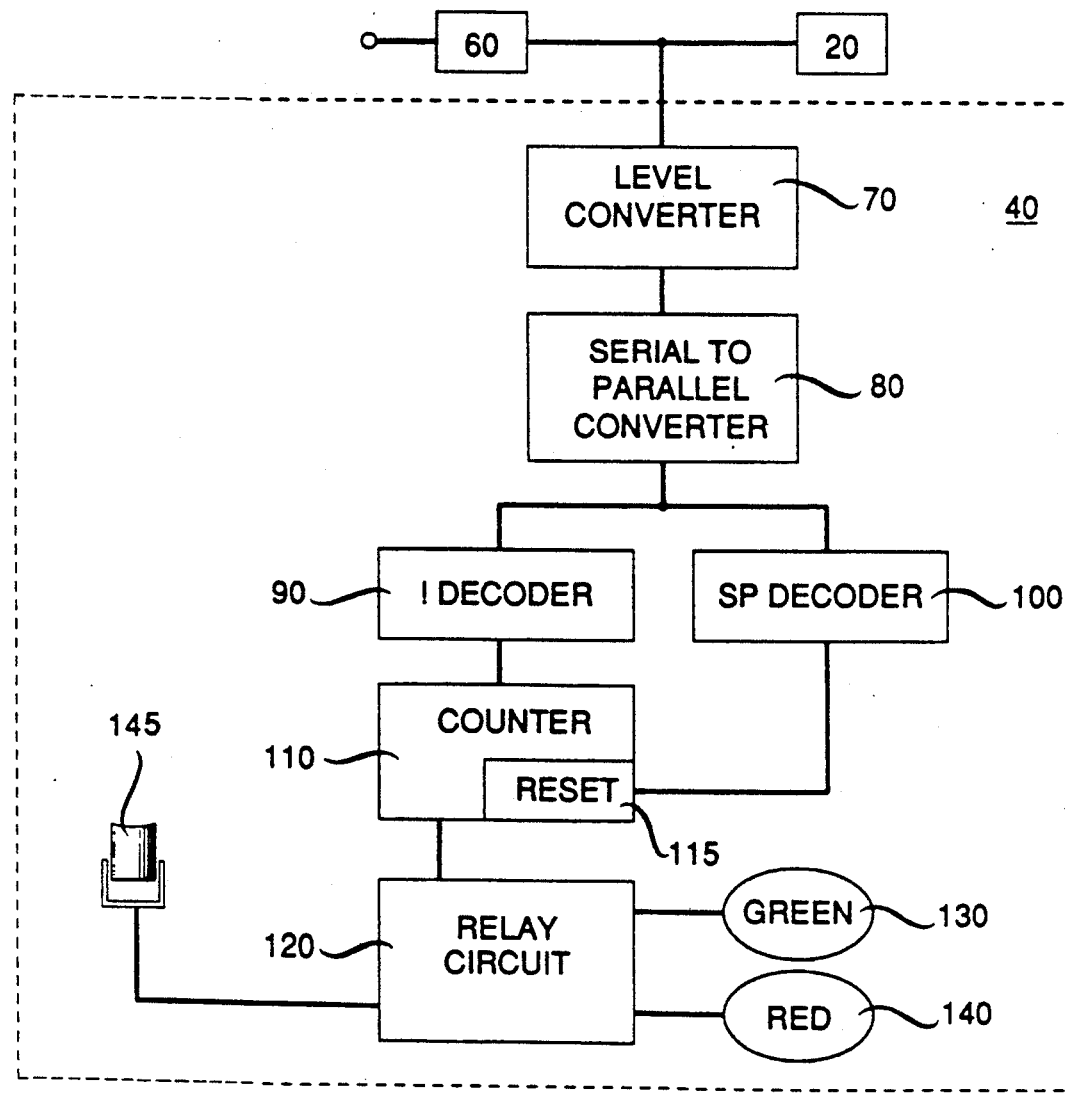
FIG. 2 shows a block diagram of an illustrative remotely operable switch.

Referring now to FIG. 2, switch 40 is attached to the same end of interface 60 as receiving device 20. If the input to switch 40 has a logic type that is incompatible with the circuit elements of switch 40, the input signal is first sent to a logic (i.e., level) converter 70. For example, if the switch operates using TTL logic, and the input signal comes from an RS-232 interface, then the input signal must be converted to TTL logic using, for example, a 1489 IC to perform the conversion.

Next, the signal is converted from serial to parallel using serial-to-parallel converter 80. In this step, each ASCII character in the input is converted by converter 80 to a linear array of eight bits. This array is then simultaneously fed into decoders 90 and 100. Each of decoders 90 and 100 is designed to respond to precisely one of the $2^8$ possible eight-bit arrays. A decoder responds by changing its output state, for example, from high to low or from low to high.

If switch 40 is to be activated by sequences of the form $!x_1!x_2!x_3!x_4!x_5$, where each of the $x_i$ is any non-excluded ASCII character, and the excluded characters are the exclamation point and, e.g., the character space, then decoder 90 responds to the array that is the ASCII representation of the exclamation point, and decoder 100 responds to the array that is the ASCII representation of the character space. The choice of the exclamation point and the character space as the characters to be decoded is only one of many possible choices. Instead of the exclamation point, any character can be used, provided the corresponding sequences analogous to $!x_1!x_2!x_3!x_4!x_5$ are rare enough to preclude, for practical purposes, the occurrence of false signals (i.e., activation of the message light when electronic mail has not been sent). Similarly, other characters besides the character space can be chosen as the character decoded by decoder 100. However, decoder 100 has an important function, described below, which relies on decoding a character that appears with relatively high frequency. For that reason, the character space is an especially appropriate choice.

Figure 3:
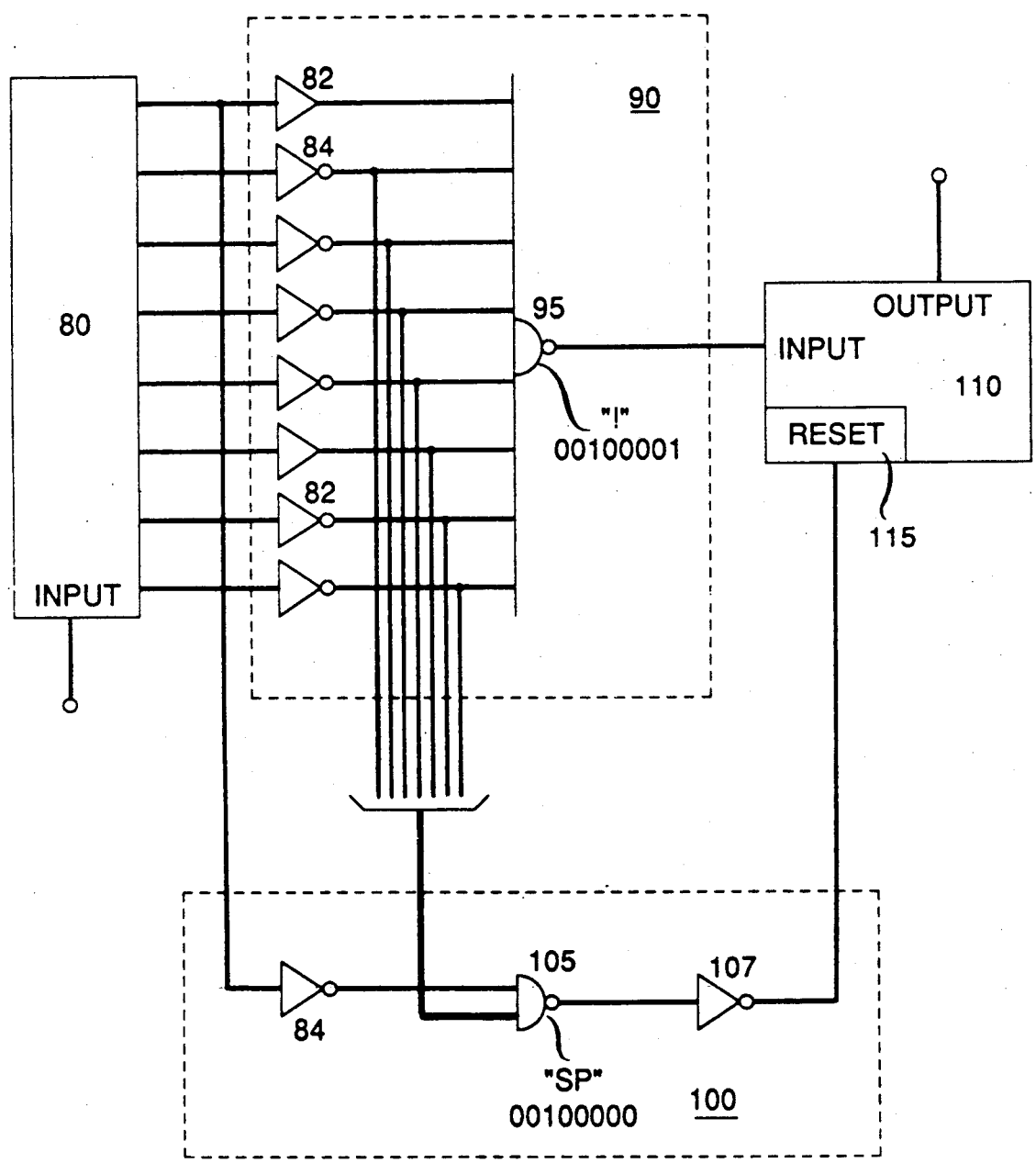
FIG. 3 is a simplified electronic schematic diagram of one possible embodiment of the switch of FIG. 2.

One possible circuit configuration for decoders 90 and 100 is shown in FIG. 3. Decoder 90 comprises 8-input NAND gate 95, and decoder 100 comprises 8-input NAND gate 105. Between the 8-bit output of serial-to-parallel converter 80 and the inputs to the NAND gates is an array of buffers 82 and inverters 84. Each output bit from converter 80 is either buffered or inverted before being fed into one of the eight inputs of NAND gate 95, and is either buffered or inverted before being fed into one of the eight inputs of NAND gate 105. For each NAND gate, the pattern of buffers and inverters affecting that gate's input is arranged such that when the character to be detected appears at the output of converter 80, an array of eight "1"s appears at the input of the NAND gate.

Referring to FIGS. 2 and 3, the output of decoder 90 (for example, the output of NAND gate 95) is fed into the input of counter 110. If the activating sequence includes, for example, precisely five exclamation points, then counter 110 is chosen to be a count-to-five counter. That is, each time the output of decoder 90 changes state in response to detection of an exclamation point, counter 110 in internally incremented by one count. When the total internal count reaches five, the output of counter 110 changes state. When the RESET input 115 of counter 110 is activated, the output of the counter returns to its initial state, and the internal count is restored to zero. The RESET input is activated by the output of decoder 100 (for example, the output of NAND gate 105) in response to detection of a character space. (If necessary in order to reset counter 110, the output of NAND gate 105 may first be inverted by inverter 107.) Thus if the activating sequence is interrupted by a character space before five exclamation points have been detected, the counter is reset, and the interrupted sequence fails to activate switch 40.

In order for decoder 90 or decoder 100 to change its output state in response to a decoded character (i.e., the exclamation point or the character space, respectively), the decoder must initially be in the output state corresponding to non-detection of the decoded character. That is, if, for example, decoder 90 changes its output from 0 to 1 upon detection of an exclamation point, then in order to decode an exclamation point, the output state of decoder 90 must initially be 0. One way to achieve this is for the output state of the decoder to drop to 0 whenever a character other than the exclamation point appears at the input. In that case, a sequence of the form $!x_1!x_2!x_3!x_4!x_5$ causes five discrete pulses to appear at the output of the decoder.

Significantly, two or more exclamation points in immediate succession will be counted as a single exclamation point. Similarly, any number of non-decoded characters in immediate succession will have the same effect as a single non-decoded character.

Referring again to FIG. 2, the output of counter 110 is fed into relay circuit 120. When the counter reaches a count of, e.g., five and changes its output state accordingly, the signal from the counter activates the relay circuit. The relay circuit is readily used, for example, to switch OFF a green standby lamp 130, and at about the same time to switch ON a red message lamp 140. The relay circuit is readily reset to its standby condition using, for example, a manual switch (not shown).

Figure 4:
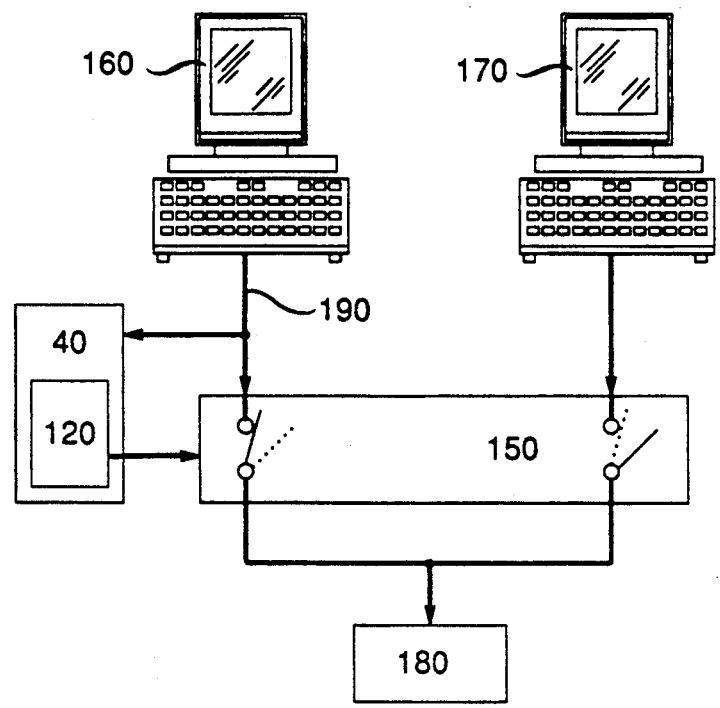
FIG. 4 shows a block diagram of an illustrative communication system including a computer I/O device such as a line printer.

Although the above description refers to an embodiment of the invention involving the use of relay circuit 120 to activate a message light or lights, it is clear that other uses of the invention are possible. For example, with reference to FIG. 4, switch 40 can readily be used to operate switch 150 between personal computers 160 and 170 and line printer 180. When computer 160 sends a stream of data to the line printer via communication channel 190, which may, for example, be a cable or a radio link, an activating sequence appended at the beginning of the data stream is detected by switch 40. In response, relay circuit 120 activates switch 150, which closes the connection between computer 160 and the line printer, while opening the connections between the line printer and other computers, such as computer 170. Thus in this embodiment, computer 160 is the sending device, and line printer 180 is the receiving device.

Figure 5:
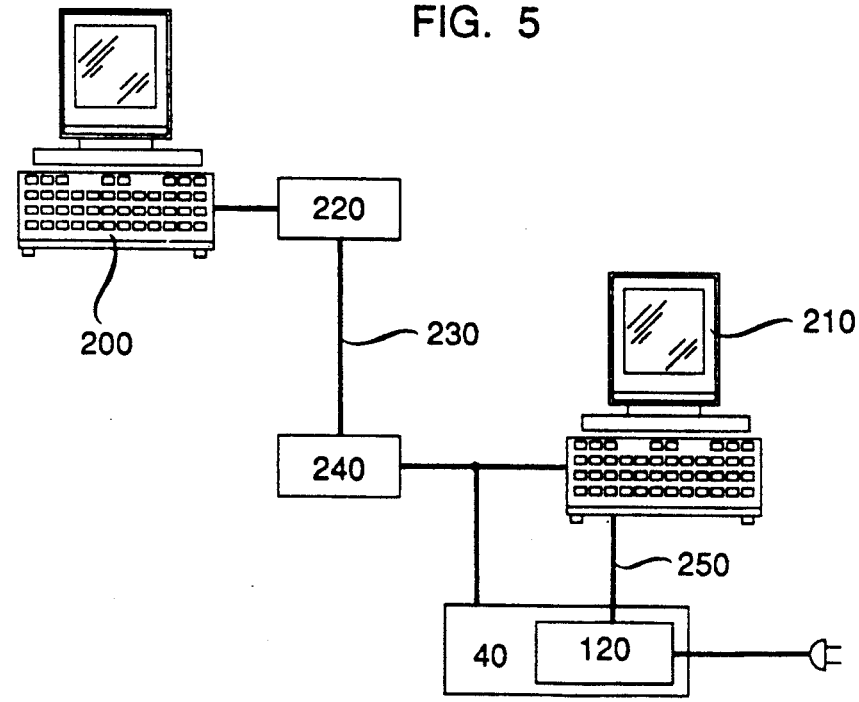
FIG. 5 shows a block diagram of an illustrative communication system including modems and a telephone line.

With reference to FIG. 5, in yet another embodiment of the invention, the sending device is computer 200, the receiving device is computer 210, and the digital communication medium comprises modem 220, telephone line 230, and modem 240. By means of switch 40, an operator of computer 200 can remotely turn on computer 210. That is, the operator sends an activating sequence to switch 40 via computer 200, the telephone line, and the two modems. The activating sequence causes relay circuit 120 to close the power circuit to computer 210, turning computer 210 on. The user can then communicate with computer 210 via computer 200, the two modems, and the telephone line.

EXAMPLE

Within an exemplary digital mail-waiting-light circuit, the output of an RS-232 interface was converted to TTL logic, using a 1489 IC. The resulting serial TTL signal was fed into a Universal Asynchronous Receiver Transmitter (UART) (a 6402 IC), which converted the serial signal to a parallel form. The baud rate (set at 9600) for the UART was provided by a 14411 baud rate generator IC. The parallel signal was decoded using two 74LS30 8-input NAND gate ICs. By means of buffers and inverters, one of the NAND gates was configured to decode "!", which is binary 0100001, and the other NAND gate was configured to decode ""(character space), which is binary 0100000. The input of a divide-by-5 74LS90 IC was configured to be incremented by the output of the "!" decoder in response to "!" followed by one non-decoded character. The RESET input of the counter was configured to be activated by the output of the character-space decoder in response to a character space followed by one non-decoded character. The output of the counter, after incrementing to five, was configured to turn on a 2N3904 transistor, which would then turn on a latching relay. The relay was configured to stay on until manually reset by a normally closed push-button switch 145, as shown in FIG. 2. The relay was wired to alternately operate red and green LEDs.

Power was supplied to the circuit by a plug-mounted transformer rectifier, and regulated by a 7805 five-volt regulator IC.

To test the digital mail-waiting-light circuit, an RS-232 "T" connector was installed on a UNIX ™-compatible personal computer a PC-6300 serial port and the digital mail-waiting-light circuit was connected to the incoming data line. A CTRM terminal-emulation program was loaded up and then logged onto a computer network running under the UNIX TM operating system. A text file was created, whose contents consisted of the string "!x!x!x!x!x". The digital mail-waiting light was reset. The contents of the file were then output at the terminal (using the UNIX TM "cat" command). This action activated the digital mail-waiting-light circuit, causing the mail-waiting light to be turned on.

In a second test, an electronic mail message containing the string "!x!x!x!x!x" was sent to the terminal. This action also caused the mail-waiting light to be turned on.

In a third test, a solid state TTL relay was added to the digital mail-waiting-light circuit, and a modem (set for auto answer) was connected to the circuit. When the circuit was activated by sending text containing the string "!x!x!x!x!x" to the modem, the solid state TTL relay closed a connection to a 115-volt power source.

I claim:

1. A communication system, comprising:
   means for producing digital signals;
   means for receiving digital signals;
   a communication medium for conveying signals from the producing to the receiving means;
   activating means capable of opening or closing an external circuit when said activating means are energized;
   control means adapted to receive signals from the communication medium, the control means being further adapted to energize the activating means in response to signals received from said communication medium, such that when the control means receive a sequence of digital bits having predetermined properties, the activating means are energized; and
   means for electrically powering the control means such that the activating means can be energized independently of whether the receiving means are powered ON or OFF,
   Characterized in that
   the control means comprise:
   (a) means for receiving, from the producing means via the communication medium, signals representing alphanumeric characters;
   (b) a converter for converting received signals to parallel binary representations of alphanumeric characters, whereby characters encoded in the received signals may be converted, the converter having output terminals;
   (c) a first decoder for producing an output pulse in response to the appearance, at the output terminals of the converter, of a converted activating character;
   (d) a counter for producing an output pulse after a designated number of output pulses from the first decoder;
   (e) a second decoder for resetting the counter whenever a converted resetting character appears at the output terminals of the converter; and
   (f) means for energizing the activating means whenever an output pulse is produced by the counter.

2. The apparatus of claim 1, further comprising at least one external circuit in electrical contact with the activating means such that when the activating means are energized, said external circuit is opened or closed.

3. The apparatus of claim 2, wherein the producing means comprise a first computer.

4. The apparatus of claim 3, wherein the receiving means comprise a computer output device, the communication medium comprises a communication channel for conveying data from the first computer to the computer output device, and the external circuit comprises a gate circuit which, when open, interrupts the flow of data from the communication channel to the output device and which, when closed, permits the flow of data from the communication channel to the output device.

5. The apparatus of claim 4, wherein the computer output device is a line printer.

6. The apparatus of claim 3, wherein the receiving means comprise a second computer.

7. The apparatus of claim 6, wherein the external circuit substantially corresponds to a power circuit of the second computer, such that when the external circuit is closed, the computer is turned on, and when the external circuit is open, the computer is turned off.

8. The apparatus of claim 6, further comprising at least one auxiliary device, wherein the external circuit substantially corresponds to a power circuit of said auxiliary device such that when the external circuit is open, the auxiliary device is turned off, and when the external circuit is closed, the auxiliary device is turned on.

9. The apparatus of claim 8, wherein the at least one auxiliary device comprises an electric light.

10. The apparatus of claim 8, wherein the at least one auxiliary device comprises a pair of electric lights electrically connected to a pushbutton switch, the auxiliary device having first and second states, each characterized by one, but not the other of the lights being turned on, and the pushbutton switch having the effect, when activated while the auxiliary device is in the second state, of restoring the auxiliary device to the first state.

11. The apparatus of claim 1, wherein the output of the first decoder is characterized by a first output state when an activating character is converted, and by a second output state when any other character is converted, and wherein a pulse for activating the counter consists of two successive transitions between decoder output states.

12. The apparatus of claim 11, wherein the output of the second decoder is characterized by a first output state when a resetting character is converted, and by a second output state when any other character is converted, and wherein a pulse for resetting the counter consists of two successive transitions between decoder output states.

13. The apparatus of claim 12, wherein each of the first and second decoders comprises a NAND gate having a number n of inputs, n being an integer greater than two, each of the n inputs being preceded by an inverter or a buffer, and wherein the choice between an inverter or a buffer to precede a particular input is determined by whether the bit of the decoded character corresponding to that input is, respectively, a 0 or a 1.

14. The apparatus of claim 13, wherein the resetting character is the character space.

* * * * *